(12) United States Patent
Forbes et al.

(10) Patent No.: US 6,950,585 B2
(45) Date of Patent: *Sep. 27, 2005

(54) HOLLOW CORE PHOTONIC BANDGAP OPTICAL FIBER

(75) Inventors: Leonard Forbes, Corvallis, OR (US); Joseph E. Geusic, Berkeley Heights, NJ (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/804,421

(22) Filed: Mar. 19, 2004

(65) Prior Publication Data

US 2004/0175085 A1 Sep. 9, 2004

Related U.S. Application Data

(63) Continuation of application No. 10/099,044, filed on Mar. 13, 2002, now Pat. No. 6,829,421.

(51) Int. Cl.[7] .................................................. G02B 6/16
(52) U.S. Cl. ........................ 385/123; 385/125; 385/124; 385/126
(58) Field of Search ....................... 385/49, 88, 115–141

(56) References Cited

U.S. PATENT DOCUMENTS

| | | | |
|---|---|---|---|
| 1,628,417 A | 5/1927 | Miller | 65/68 |
| 5,734,773 A | 3/1998 | Teshima et al. | 385/126 |
| 5,815,627 A | 9/1998 | Harrington | 385/125 |
| 5,827,346 A | 10/1998 | Kopylov et al. | 65/384 |
| 6,090,636 A | 7/2000 | Geusic et al. | 438/31 |
| 6,141,476 A | 10/2000 | Matsuura et al. | 385/125 |
| 6,150,188 A | 11/2000 | Geusic et al. | 438/31 |
| 6,334,019 B1 | 12/2001 | Birks et al. | 385/125 |
| 6,640,037 B2 * | 10/2003 | Gallagher | 385/125 |
| 2003/0174986 A1 * | 9/2003 | Forbes et al. | 385/125 |

OTHER PUBLICATIONS

Agio, M., et al., "Complete photonic band gap in a two–dimensional chessboard lattice", *Physical Review B (Condensed Matter)*, 61(3), (Jun. 15, 2000), pp. 15519–15522.

Alfimov, M.V., "Photonic crystal fibers with a photonic band gap tunable within the range of 930–1030 nm", *JETP Letters*, 71(12), (2000), pp. 489–492.

Baba, T., et al., "Fabrication and photoluminescence studies of GaInAsP/InP 2–dimensional photonic crystals", *Journal of Applied Physics, Part 1 (Regular Paper & Short Notes)*, 35(2)B, (Feb. 1996), pp. 1348–1352.

Baba, T., et al., "Possibility of InP–based 2–dimensional photonic crystal: an approach by the anodization method", *Japanese Journal of Applied Physics, Part 1 (Regular Papers & Short Notes)*, 34(2B), (Feb. 1995), pp. 1405–1408.

Baba, T., et al., "Theoretical calculation of photonic gap in semiconductor 2–dimensional photonic crystals with various shapes of optical atoms", *Japanese Journal of Applied Physics, Part 1 (Regular Papers & Short Notes)*, 34(8B), (Aug. 1995), pp. 4496–4498.

(Continued)

*Primary Examiner*—Phan T. H. Palmer
(74) *Attorney, Agent, or Firm*—Schwegman, Lundberg, Woessner & Kluth, P.A.

(57) ABSTRACT

A photonic crystal optical fiber made up of an array of conventional hollow core optical fibers is disclosed. The array of optical fibers omits at least one fiber to form a central hollow core. The fiber works on the principle of two-dimensional photonic crystals to confine the radiation in a guided wave within the central hollow core. The fiber has a true photonic bandgap in which radiation of a particular energy or wavelength is totally forbidden, thereby providing a very high reflection coefficient to radiation incident the walls of the central hollow core over a select range of angles. The central hollow core allows for radiation propagation with minimal absorption.

22 Claims, 10 Drawing Sheets

OTHER PUBLICATIONS

Barkou, S.E., et al., "Silica–air photonic crystal fiber design that permits waveguiding by a true photonic bandgap effect", *Optics Letters, 24(1)*, (Jan. 1, 1999), pp. 46–48.

Birks, T.A., et al., "Endlessly single–mode photonic crystal fiber", *Optics Letters, 22(3)*, (Jul. 1, 1997), pp. 961–963.

Brechet, F., et al., "Complete analysis of the characteristics of propagation into photonic crystal fibers by the finite element method", *Optical Fiber Technology: Materials, Devices and Systems, 6(2)*, (Apr. 2000), pp. 181–191.

Broeng, J., et al., "Analysis of air–guiding photonic bandgap fibers", *Optics Letters, v 25, n 2*, (Jan. 15, 2000), pp. 96–98.

Broeng, J., et al., "Photonic crystal fibers: a new class of optical waveguides", *Optical Fiber Technology: Materials, Devices and Systems, 5(3)*, (Jul. 1999), pp. 305–330.

Chan, Y.S., et al., "Photonic band gaps in two dimensional photonic quasicrystals", *Physical Review Letters, 80(5)*, (Feb. 2, 1998), pp. 956–959.

Charlton, M.D., et al., "Guided mode analysis, and fabrication of a 2–dimensional visible photonic band structure confined within a planar semiconductor waveguide", *Materials Science & Engineering B (Solid–State Materials for Advanced Technology), B49(2)*, (Sep. 1997), pp. 155–165.

Eggleton, B.J., et al., "Cladding–mode–resonances in air–silica microstructure optical fibers", *Journal of Lightwave Technology, 18(8)*, (Aug. 2000), pp. 1084–1100.

Fedotov, A.B., et al., "Holey fibers with 0.4–32– mu m–lattice–constant photonic band–gap cladding: fabrication, characterization, and nonlinear–optical measurements", *Laser Physics, 11(1)*, (Jan. 2001), pp. 138–145.

Ferrando, A., "Nearly zero ultraflattened dispersion in photonic crystal fibers", *Optics Letters, 25(11)*, (Jun. 1, 2000), pp. 790–792.

Ferrando, A., "Single–polarization single–mode intraband guidance in supersquare photonic crystals fibers", *Applied Physics Letters, 78(21)*, (May 21, 2001), pp. 3184–3186.

Foteinopoulou, S., et al., "In– and out–of–plane propagation of electromagnetic waves in low index contrast two dimensional photonic crystals", *Journal of Applied Physics, 89(2)*, (Jan. 15, 2001), pp. 824–830.

Hansen, T P., et al., "Highly birefringent index–guiding photonic crystal fibers", *IEEE Photonics Technology Letters, 13(6)*, (Jun. 2001), pp. 588–590.

Hecht, J., "Holes in Photonic Crystal Fibers Open New Possibilities", *Laser Focus World, 37(5)*, (May 2001), pp. 207.

Jin, Chong–Jun, et al., "A novel two–dimensional photonic crystal", *Chinese Physics Letters, 16(1)*, (1999), pp. 20–22.

Jin, Chong–Jun. et al., "Two Dimensional Photonic Band Structure: Triangular Non–Bravais Lattice", *Acta Optica Sinica, 17*, (1997), p. 409.

Jones–Bey, H., "Photonic crystal fiber yields near–IR solutions", *Laser Focus World, 36(1)*, (Jan. 2000), pp. 15–16.

Knight, J.C., et al., "All–silica single–mode optical fiber with photonic crystal cladding", *Optics Letters, 21(19)*, (Oct. 1, 1996), pp. 1547–1549.

Knight, J.C., et al., "Anomalous dispersion in photonic crystal fiber", *IEEE Photonics Technology Letters, 12(7)*, (Jul. 2000), pp. 807–809.

Knight, J.C., et al., "Bragg scattering from an obliquely illuminated photonic crystal fiber", *Applied Optics, 37(3)*, (Jan. 20, 1998), pp. 449–452.

Knight, J.C., et al., "Large mode area photonic crystal fibre", *Electronics Letters, 34(13)*, Jun. 25, 1998), pp. 1347–1348.

Knight, J.C., et al., "Photonic crystals as optical fibres–physics and applications", *Optical Materials, 11(2–3)*, (Jan. 1999), pp. 143–151.

Knight, T.C., "Properties of photonic crystal fiber and the effective index model", *Journal of the Optical Society of America A (Optics, Image Science and Vision), 15(3)*, (Mar. 1998), pp. 748–752.

Mogilevtsev, D., et al., "Group–velocity dispersion in photonic crystal fibers", *Optics Letters, 23(21)*, (Nov. 1, 1998), pp. 1662–1664.

Monro, T.M., et al., "Holey optical fibers: An efficient modal model", *Journal of Lightwave TechnoloTgy, 17(6)*, (Jun. 1999), pp. 1093–1102.

Monro, T.M., et al., "Modeling large air fraction holey optical fibers", *Journal of Lightwave Technology, 18(1)*, (Jan. 2000), pp. 50–56.

Optoelectronics Group, University Of Bath, "Photonic Crystal Fibre", http://www.bath.ac.uk/physics/groups/opto/pcf.html, (Jul. 27, 2001).

Ranka, J.K., et al., "Optical properties of high–delta air–silica microstructure optical fibers", *Optics Letters, 25(11)*, (Jun. 1, 2000), pp. 796–798.

Rastogi, V., et al., "Propagation characteristics of a segmented cladding fiber", *Optics Letters, 26(8)*, (Apr. 15, 2001), pp. 491–493.

Sanchez–Perez, J.V., et al., "Sound attenuation by a two–dimensional array of rigid cylinders", *Physical Review Letters, 80(24)*, (Jun. 15, 1998), pp. 5325–5328.

Scherer, A., et al., "Photonic crystal cavities and waveguides", *Device Research Conference, Conference Digest*, (2001), pp. 115–118.

Steel, M.T., et al., "Elliptical–hole photonic crystal fibers", *Optics Letters, 26(4)*, (Feb. 15, 2001), pp. 229–231.

Steel, M.T., et al., "Symmetry and degeneracy in microstructured optical fibers", *Optics Letters, 26(8)*, (Apr. 15, 2001), pp. 488–490.

Wheeler, M.D., "Photonic crystal protends fiber optics breakthrough", *Photon Spectra, 32(1)*, (Jan. 1998), p. 34.

* cited by examiner

HOLLOW CORE PHOTONIC BANDGAP OPTICAL FIBER

RELATED APPLICATION

This application is a continuation of U.S. application Ser. No. 10/099,044 filed on Mar. 13, 2002, now U.S. Pat. No. 6,829,421 and incorporated herein by reference.

FIELD OF THE INVENTION

The present invention relates to optical fibers, and in particular to a hollow core photonic bandgap optical fiber.

BACKGROUND OF THE INVENTION

Optical fibers are long, thin waveguide strands. They are used in a variety of applications involving the reception, transmission and detection of radiation, ranging from optical telecommunications to scientific instrumentation to ornamental displays. Conventional optical fibers have a high-index core surrounded by a low-index cladding, a geometry that results in the total internal reflection of radiation entering the fiber over a select range of angles. Other forms of conventional optical fibers are referred to as "light tunnels" and use reflection from reflective walls rather than total internal reflection. Conventional optical fibers can have a variety of core geometries, including elliptical cores, double cores, polarization-maintaining cores, and hollow cores.

Hollow core optical fibers are desirable where transmission losses need to be minimized, since in conventional optical fibers most of the radiation loss in an optical fiber occurs from absorption in the solid core. However, conventional optical fibers that depend on total internal reflection for waveguiding and confinement need to have a core with a higher dielectric constant than that of the cladding. Such a structure is at odds with an optical fiber having a hollow central core, since air has a dielectric constant lower than all known practical cladding materials. Thus, hollow core optical fibers generally require specialized design considerations.

There are a number of different types of hollow core optical waveguides that operate on the either principle of total internal reflection or the principles of conventional reflection. For example, hollow optical waveguides through silicon wafers with highly reflective coatings on the side of the hollow core are disclosed in U.S. Pat. No. 6,090,636 to Geusic et al. An optical fiber interconnect through a silicon wafer with a hole filled with two different dielectric materials is disclosed in U.S. Pat. No. 6,150,188 to Geusic et al. A hollow optical fiber or hollow core waveguide consisting of a dielectric material coated with a highly reflective exterior coating is disclosed in U.S. Pat. No. 5,815,627 to Harrington, wherein the hollow core can contain one guided wave and the annular ring another guided wave. A hollow core optical waveguide having a highly reflective coating on the inside of a glass tube is disclosed in U.S. Pat. No. 6,141,476 to Matsuura.

As mentioned above, a desirable property for an optical fiber is minimal transmission loss. Accordingly, there has been significant effort to form optical fibers from materials that have high transmission and high reflection. Some of this effort has been directed to forming optical fibers from quasi-two-dimensional photonic crystals. A photonic crystal is a substrate within which is formed an array of period structures through which radiation of a particular wavelength or energy is forbidden to propagate. The result is a material with a very high reflectivity. Two-dimensional photonic bandgap crystal structures have been reported not only at optical wavelengths but at acoustic wavelengths as well.

It is well known in the semiconductor industry that a series of cylindrical holes judiciously formed in a solid semiconductor material can be used to form a quasi-two-dimensional photonic bandgap crystal. FIG. 1 is a plan view of a conventional two-dimensional photonic crystal formed from a substrate 110 patterned with an triangular array of cylindrical holes 120.

An example prior art quasi-two-dimensional photonic bandgap optical fiber 210 is illustrated in FIGS. 2A and 2B. The optical fiber 210 includes an array of holes 220 formed within a cylindrical substrate 226. The fiber includes an outer cladding 228. A solid core 232, referred to as a "core defect," is at the center of the substrate. Radiation 242 is reflected within the bandgap of the photonic crystal produced by the periodic array of holes surrounding the core and is confined to the core. The radiation travels down the length of the solid core by total internal reflection made possible by the low average index of refraction of the cladding as compared to that of solid core 232. Though optical fiber 210 is photonic crystal based, it utilizes total internal reflection like a conventional optical fiber and is relatively lossy because the solid core absorbs radiation.

Accordingly, what is needed is a photonic crystal optical fiber with a hollow core that allows for low-loss radiation propagation down the fiber by virtue of highly reflectivity walls as a result of the photonic bandgap of the crystal.

SUMMARY OF THE INVENTION

A hollow core photonic crystal optical fiber formed from several smaller hollow core optical fibers layered around a hollow core is shown. The fiber works on the principle of quasi-two-dimensional photonic crystals to confine radiation in a guided wave. The fiber has a true photonic bandgap in which radiation of a particular frequency (or equivalently, energy or wavelength) is totally forbidden, thereby providing a very high reflection coefficient to radiation incident the walls of the hollow core.

The present invention includes an array of hollow core optical fibers arranged longitudinally about an axis to define a central hollow core about the axis. The array is formed so as to act as a quasi-two-dimensional photonic crystal with a photonic bandgap that allows radiation of a select frequency range to propagate down the central hollow core.

The present invention further includes a plurality of hollow core optical fibers arranged longitudinally in an array having a two-dimensional triangular lattice structure so as to form a quasi-two-dimensional photonic crystal having a photonic bandgap, and a central hollow core sized to accept radiation corresponding to the photonic bandgap. The hollow core optical fibers are, for example, conventional silica fibers.

The present invention also includes a system that includes a hollow core photonic bandgap optical fiber having an input end and an output end. The photonic bandgap optical fiber is made up of an array of hollow core optical fibers arranged longitudinally to form a two-dimensional photonic crystal lattice having a photonic bandgap. The array of optical fibers has at least one omitted optical fiber so as to leave a longitudinal central aperture that forms the hollow core in the array. The hollow core in the array is capable of guiding light having a frequency within the photonic bandgap of the array. The system further includes a radiation source optically coupled to the input end, and a photodetector optically coupled to the output end.

The present invention also includes a method of guiding radiation. The method includes forming a two-dimensional array of hollow core optical fibers to form a quasi-two-dimensional photonic crystal. The crystal has a photonic bandgap. In forming the array of fibers, at least one hollow core optical fiber is omitted. This creates a central hollow core in the array through which light of a select frequency that falls within the photonic bandgap is guided. The method further includes introducing radiation into the central hollow core having a frequency within the photonic bandgap.

These and other embodiments, aspects, advantages and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

In the Figures, the first digit of the reference number corresponds to the Figure number. Accordingly, like elements in different Figures have reference numbers that differ only in the first digit that identifies the Figure number.

DETAILED DESCRIPTION OF THE INVENTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 3A:
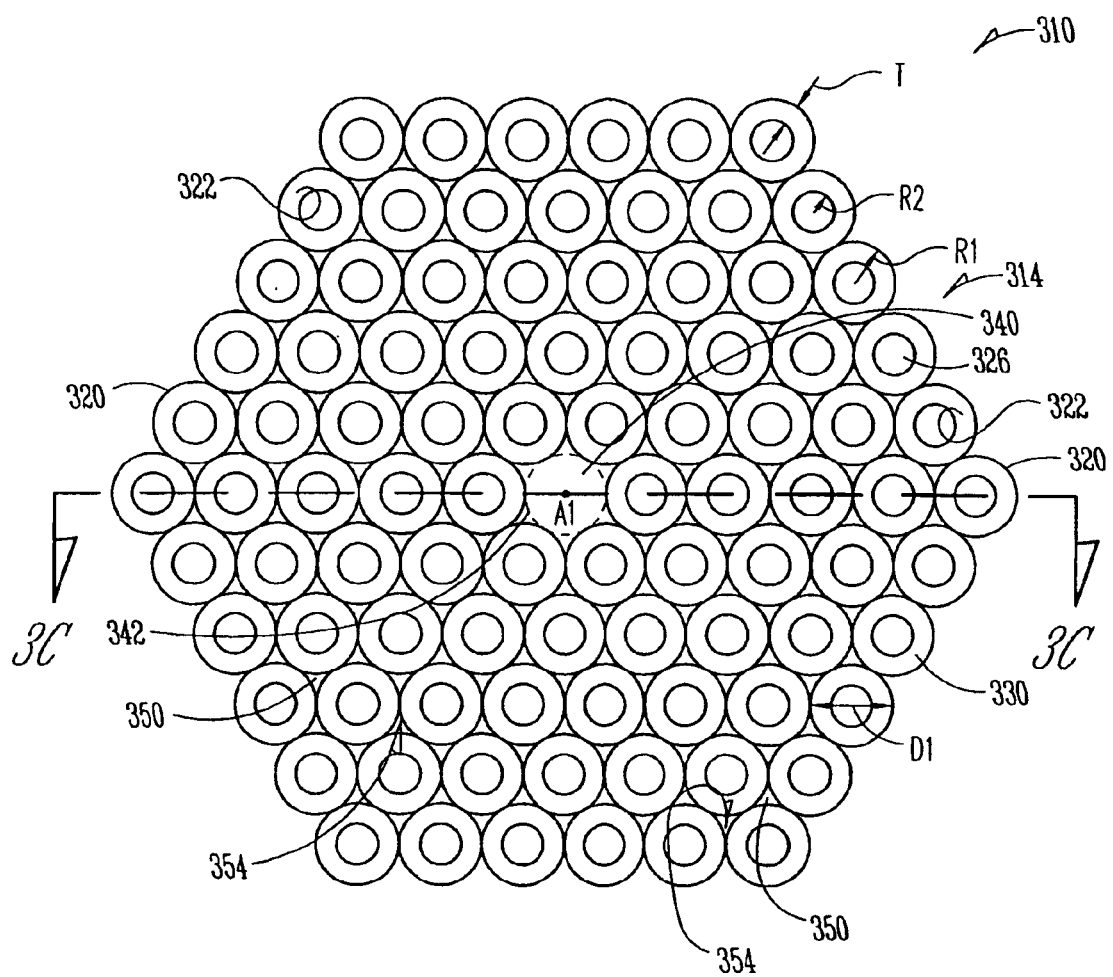
FIG. 3A is a front-end view of an embodiment of the hollow core photonic bandgap optical fiber of the present invention.

FIG. 3A is a full front-end view of an embodiment of a hollow core photonic bandgap optical fiber 310 of the present invention. Optical fiber 310 includes an array 314 of conventional hollow core optical fibers 320 each longitudinally arranged about a central axis A1. Optical fibers 320 each having an endface 322, a hollow core 326 with a dielectric constant $\in_0=1$, and an annular cladding 330 surrounding the hollow core and having a thickness T and a dielectric constant $\in_B>1$. Note that the dielectric constant of hollow core 326 is taken as the free-space dielectric constant $\in_0$, which differs from that of air by only about six parts in ten-thousand. In an example embodiment, hollow core 326 is circular in cross-section and has a radius R2. For the sake of discussion, optical fibers 320 are presumed hereinafter to have a circular hollow core.

Figure 3B:
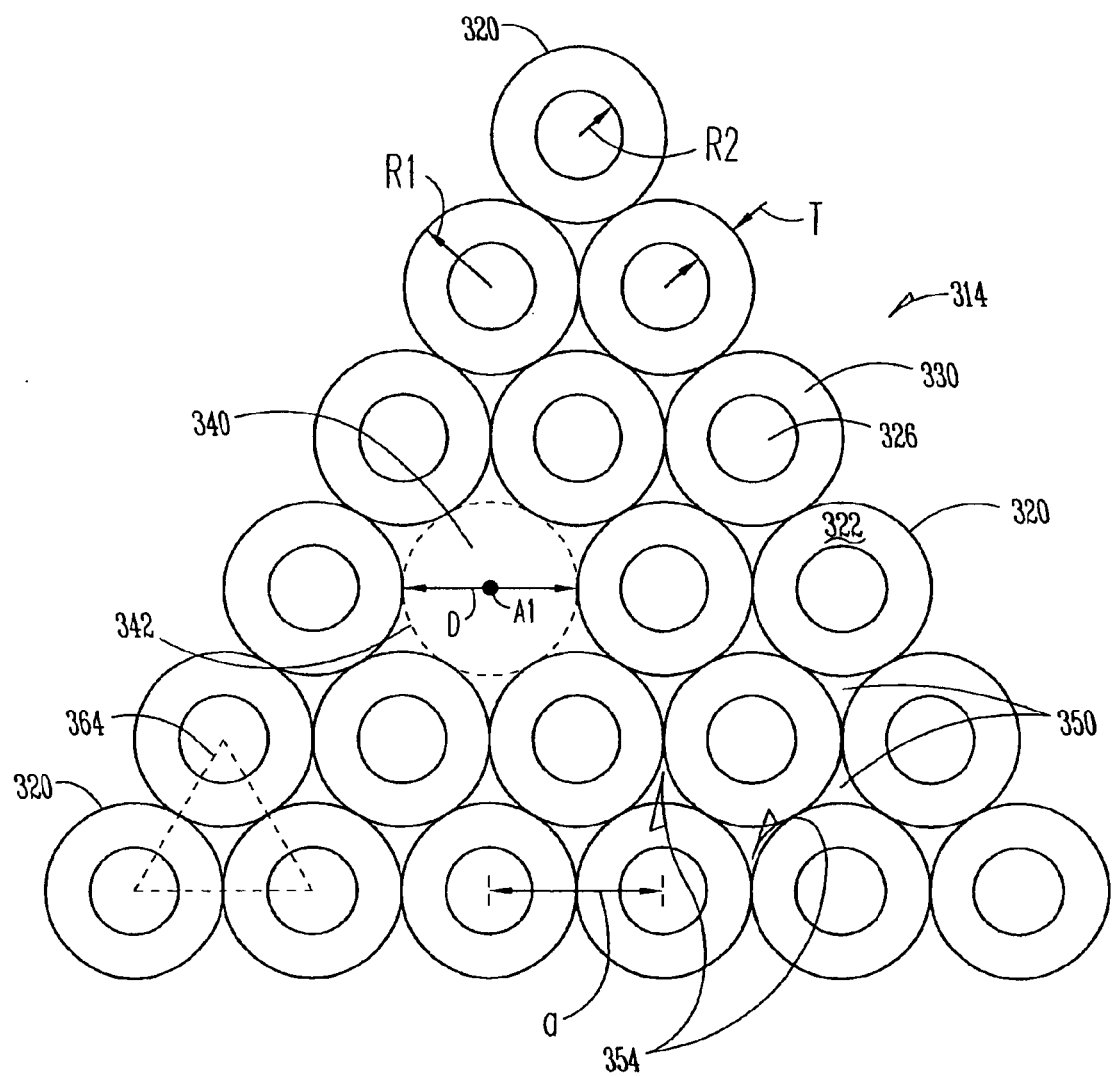
FIG. 3B is a close-up front end view of the optical fiber of FIG. 3A showing the individual conventional hollow core optical fibers making up the hollow core photonic bandgap optical fiber.

FIG. 3B is a close-up front end view of optical fiber 310 of FIG. 3A. The total radius R1 of each fiber 320 is given by R1=R2+T. The total diameter of each fiber is thus D1=2R1. The triangularly layered arrangement of fibers 320 omits at least one fiber from central axis A1, thereby leaving a longitudinal aperture or hollow core 340 centered on the central axis. Hollow core 340 is not exactly circular in cross-section, but has an effective circular cross-section 342 (dashed line). Also, hollow core 340 is also referred to hereinafter as a "central" hollow core to distinguish it from hollow cores 326 of the conventional optical fibers 320. Here, the word "central" is not intended to limit the location of the hollow core to the exact center of array 314.

Where optical fibers 320 have a circular cross-section, their arrangement in array 314 forms small gaps 350. For fibers arranged in a triangular arrangement (FIG. 3B), the gaps occur by virtue of the cusps 354 formed by placing two fibers together, and then adding a third fiber to the first two fibers at the cusps.

In an example embodiment, fiber array 314 constitutes a two-dimensional photonic crystal with a triangular lattice structure and a lattice constant a=2R1. The center wavelength and size of the bandgap of the photonic crystal depends on a number of factors, including the lattice constant a, and the difference (contrast) between dielectric constants $\in_0$ and $\in_B$. It is convenient to define single parameter called the "filling factor," which is the ratio of the volume of empty space in the crystal to the total volume of the crystal.

Figure 3C:
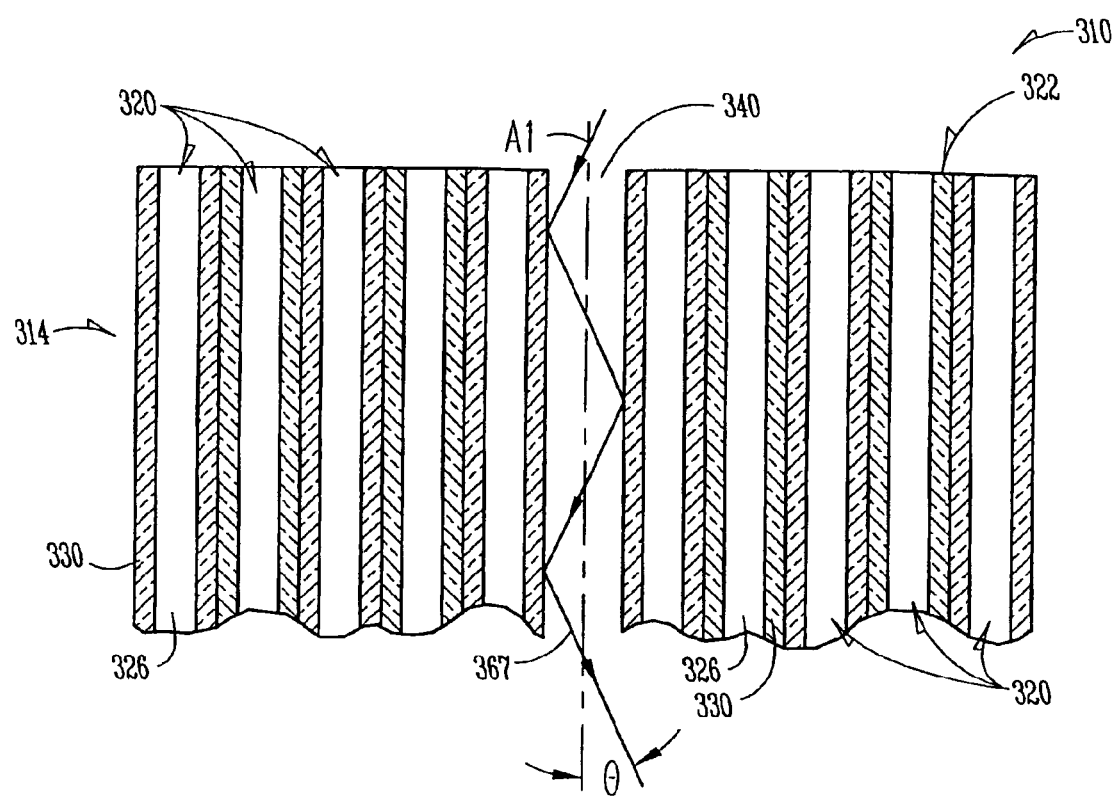
FIG. 3C is a partial cross-sectional view of the optical fiber of FIG. 3A as taken along the line 3C—3C.

FIG. 3C is a partial cross-sectional view of optical fiber 310 of FIG. 3A taken along the line 3C—3C. FIG. 3C illustrates how radiation 367 is guided in central hollow core 340. In example embodiments, central hollow core 340 has an effective diameter D ranging anywhere from 0.5 microns to 5 microns, depending on the wavelength of radiation 367 to be guided. As a general rule, the longest wavelength of radiation capable of being accepted by the central hollow core is about twice the central core diameter D. Thus, to form a hollow core photonic bandgap optical fiber capable of guiding infrared radiation of 1.5 microns for example, the diameter D of central hollow core 340 should be approximately 0.75 microns.

Because the photonic crystal formed by fiber array 314 is two-dimensional, the associated bandgap is in the directions orthogonal to radiation propagation down hollow core 330. For large incident angles θ (e.g., near degrees) measured relative to the central axis, the bandgap remains complete. For smaller angles, the bandgap width is reduced, and for increasingly large angles, the bandgap width is reduced and becomes incomplete. Thus, optical fiber 310 has a limited range of acceptance angles.

Figure 1:
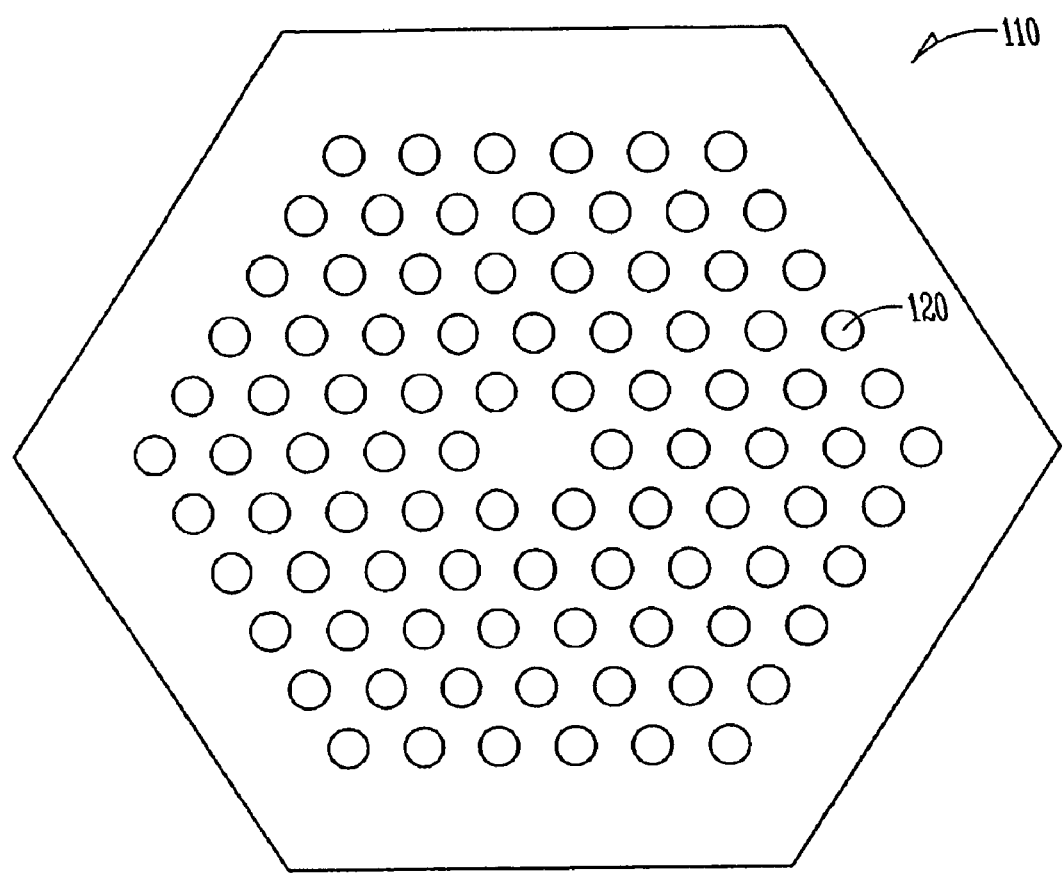
FIG. 1 is a plan view of a conventional two-dimensional photonic crystal formed from a substrate and having triangular an array of cylindrical holes formed therein.
Figure 2A:
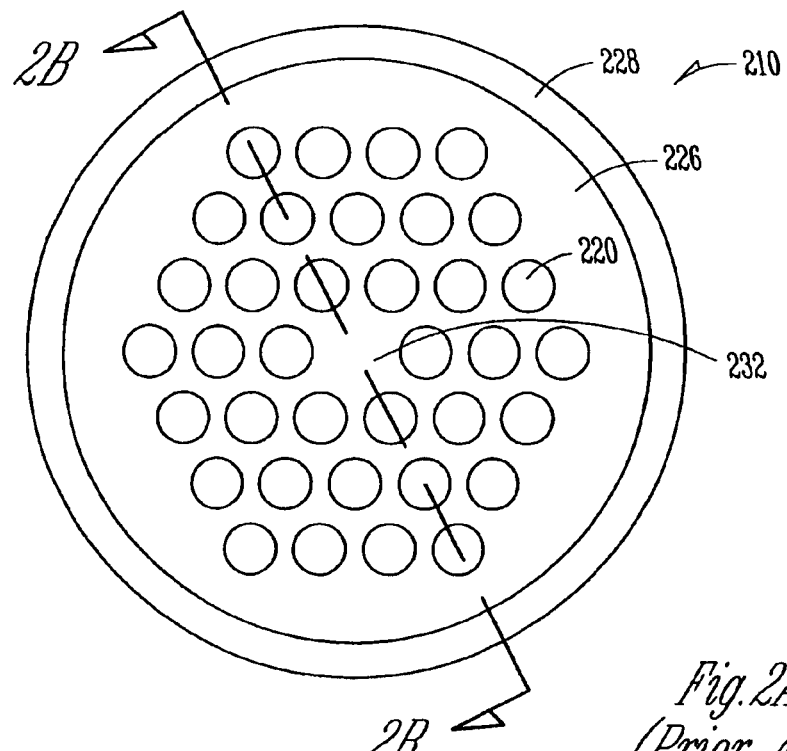
FIG. 2A is a front-end view of a prior art photonic-crystal-based optical fiber having a plurality of holes surrounding a solid core.
Figure 2B:
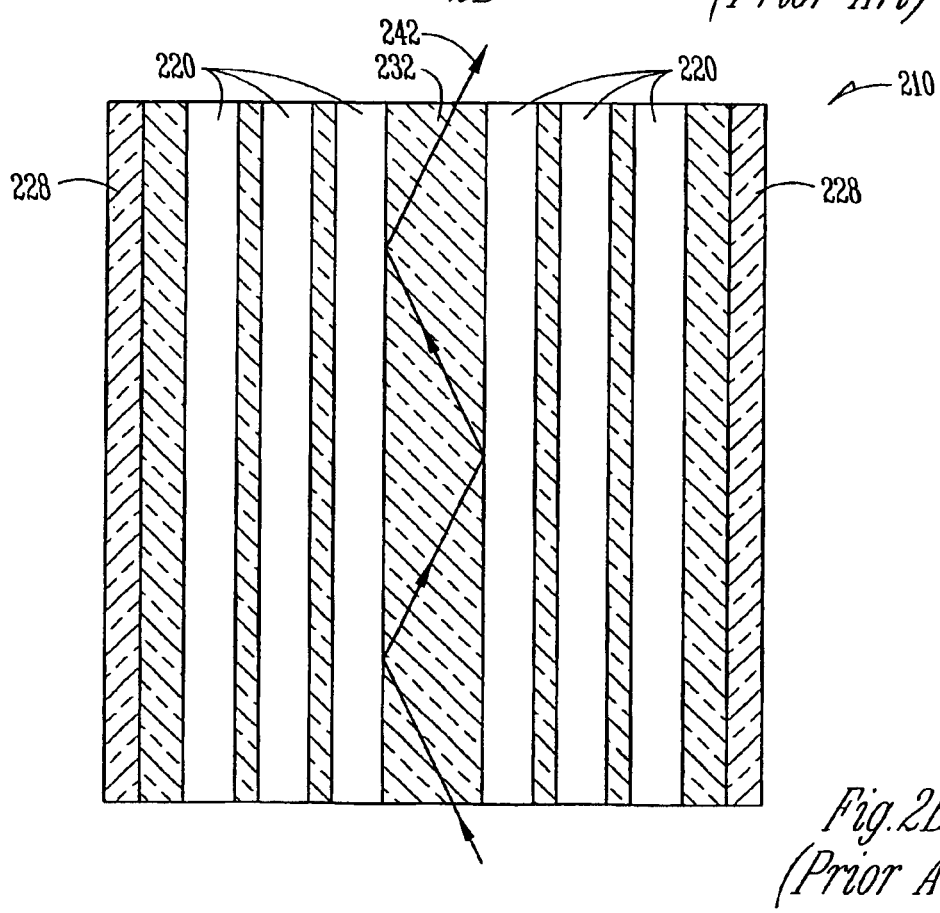
FIG. 2B is a cross-sectional view of the prior art optical fiber of FIG. 2A taken along the line 2B—2B.
Figure 4A:
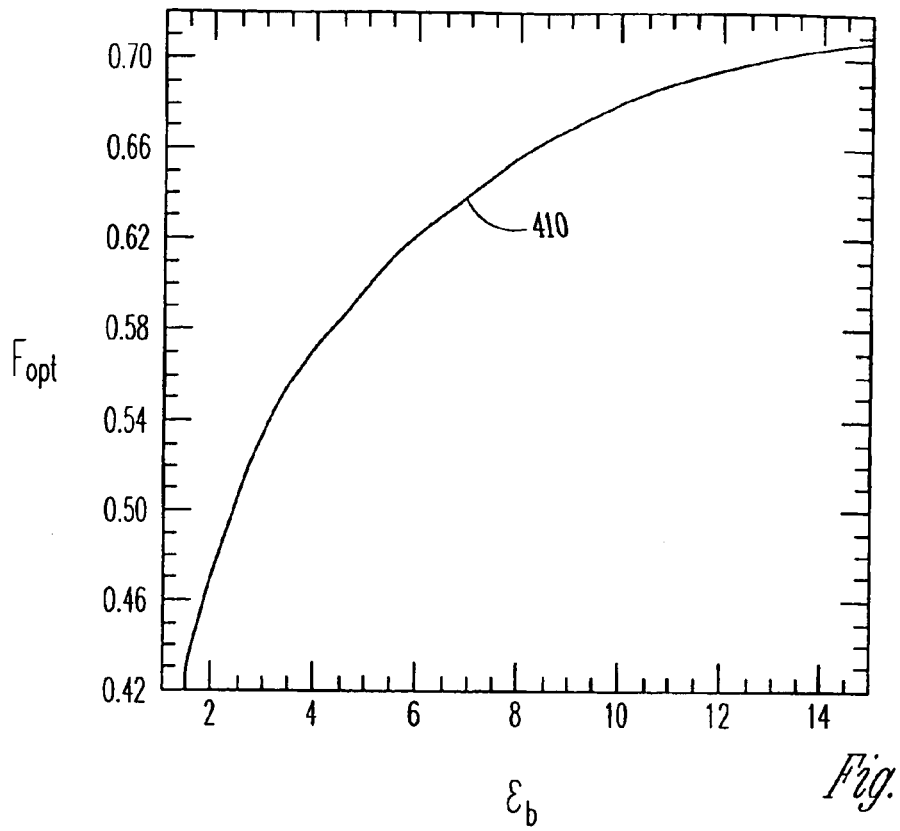
FIG. 4A is a plot of the optimal filling factor $F_{OPT}$ versus the background dielectric constant $\in_B$ for a triangular lattice structure.
Figure 4B:
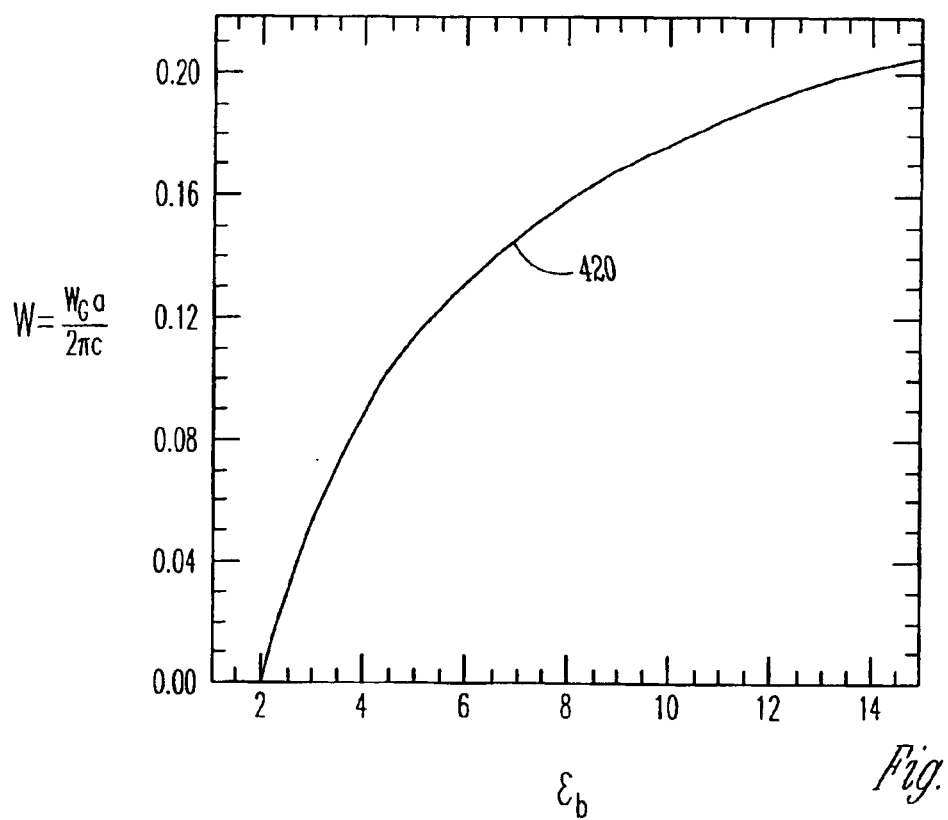
FIG. 4B is a plot of the width of the photonic bandgap as fraction of the center frequency of the bandgap versus the background dielectric constant $\in_B$ for a triangular lattice structure.

FIGS. 4A and 4B are plots adapted from FIGS. 4 and 6 of the article by M. Plihal et al., entitled "Photonic band structure of two-dimensional systems: The triangular lattice," Phys. Rev. B, 44 (16), 8565–8571, Oct. 15, 1991, which article is incorporated by reference herein. FIG. 4A plots a curve 410 of the optimal filling factor $F_{OPT}$ as a function of background dielectric constant $\in_B$ (also called the $_C$contrast$_C$) for a two-dimensional triangular lattice structure of cylindrical holes, such as shown in FIG. 1. The optimal filling factor $F_{OPT}$ is that which yields the widest bandgap for the lowest frequency. The results are applicable to the triangular lattice structure of fiber array 314 (FIG. 3B). In an example embodiment, optical fibers 320 (FIGS. 3A–3C) are made of silica, which has a dielectric constant $\in_B \sim 4$. From curve 410, it is seen that the corresponding optimum filling factor $F_{OPT}$ is about 0.55 or 55%.

In an example embodiment, optical fibers 320 are selected and assembled to provide the optimum filling factor for optical fiber array 314, as described below. FIG. 4B plots a curve 420 of the normalized width $W=(\omega_G a)/(2\pi c)$ of the photonic bandgap (i.e., the width of the bandgap as a fraction of the center frequency $\omega_G$) versus the background dielectric constant $\in_B$. Here, c is the speed of light. It can be seen from curve 420 that for a background dielectric constant $\in_B=4$, the normalized width W of the bandgap is 0.08, or 8% of the center frequency $\omega_G$.

Note also that the normalized width W of the bandgap depends directly on the lattice constant a, which is given by a=2R1. Thus, the bandgap is determined by the radius R1 of optical fibers 320 used to form the optical fiber array/photonic crystal 314. Further, the frequency of radiation capable of being guided in hollow core 340 of optical fiber 310 is determined by diameter D of the central hollow core. Thus, the lattice constant a of optical fiber array 314 and the diameter D of central hollow core 340 formed therein are selected so that the frequency of radiation accepted by central hollow core 340 overlaps the photonic bandgap associated with the fiber array 314.

Designing Fiber for a Select Filling Factor

The design of optical fiber array 314 as shown in FIGS. 3A–3C is now described. The design process includes selecting a desired filling factor F.

To this end, first an imaginary triangle 364 of area $A_T$ with vertices at the centers of three adjacent optical fibers 320 is formed (FIG. 3B).

The area $A_T$ of the imaginary triangle is given by:

$$A_T = \frac{1}{2}(2R1)(R1)(3)^{1/2} = 1.73(R1)^2 \qquad \text{Equation 1}$$

The area $A_C$ occupied by optical fibers 320 in area $A_T$ (i.e., the total area $A_T$ minus the area of gaps 350) is given by:

$$A_C = 3(\tfrac{1}{6})\pi(R1)^2 = 1.57(R1)^2 \qquad \text{Equation 2}$$

The area $A_A$ of air due to hollow cores 326 of optical fibers 320 in area $A_T$ is given by:

$$A_A = (\pi/2)(R2)^2 = 1.57(R2)^2 \qquad \text{Equation 3}$$

The filling factor F is then defined as:

$$F = A_A/A_T = [1.57(R2)^2]/[1.73(R1)^2]0.91[(R2)^2/(R1)^2] \qquad \text{Equation 4}$$

Equation 4 is used to choose the radii R1 and R2 to obtain a select filling factor F. For example, filling factor F may be selected to be the optimum filling factor $F_{OPT}$. Using the example embodiment discussed above, $F=F_{OPT}=0.55$, so that R2=0.78(R1).

It is worth noting that the area associated with gaps 350 is small (e.g., about 10%), whereas the filling factor F needed to create a significant bandgap is generally in excess of 50%. Accordingly, gaps 350 generally do not constitute a significant perturbation to the photonic crystal lattice.

Figure 5:
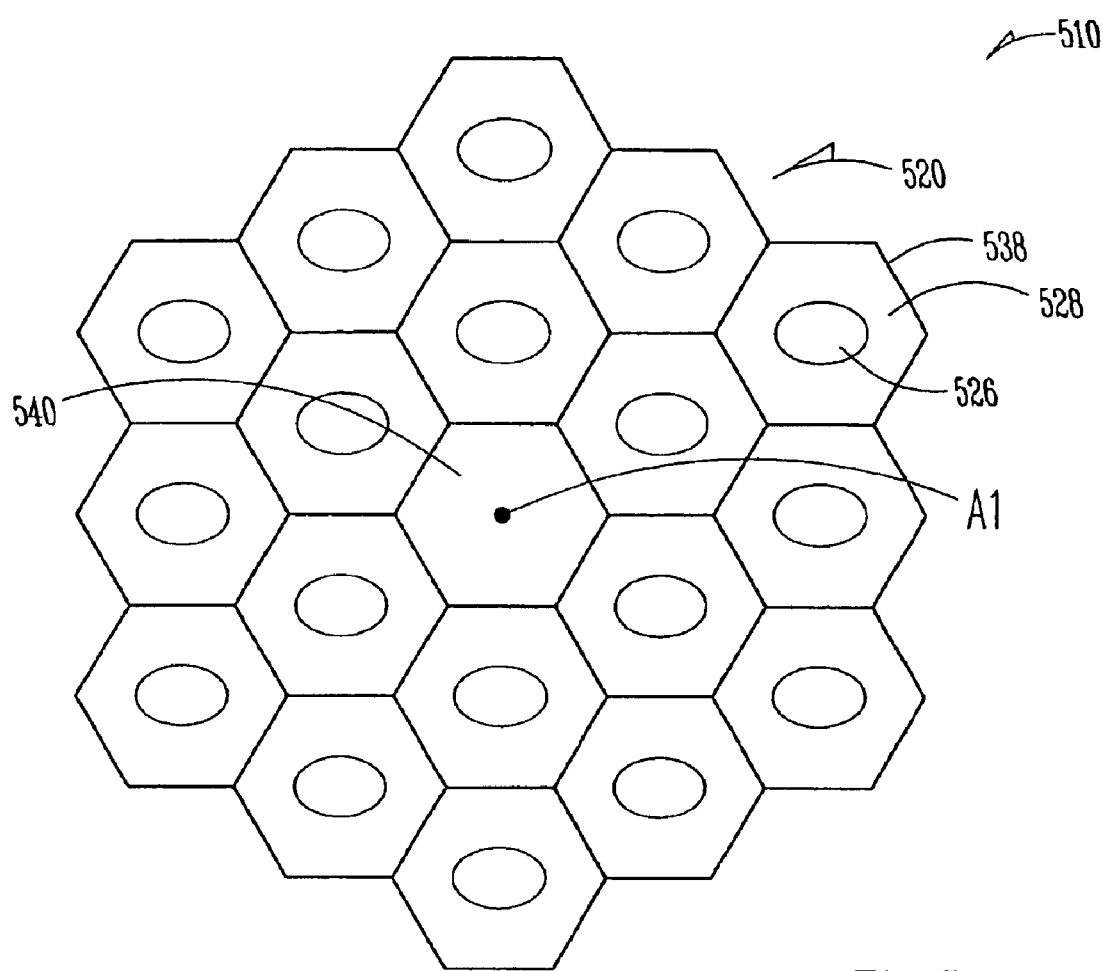
FIG. 5 is a face-on view of an alternate embodiment of the hollow core photonic bandgap optical fiber of the present invention that includes a cladding with a polygonal outer surface.

Other embodiments of hollow core photonic bandgap optical fiber similar to that of optical fiber 310 are possible with the present invention. For example, with reference to FIG. 5, there is shown a hollow core photonic bandgap optical fiber 510 made up of an array of optical fibers 520 each having an elliptical cross-section hollow core 526 surrounded by a cladding 528 having a outer surface 538 with a polygonal cross-section (e.g., hexagonal, as shown). A polygonal hollow core 540 is centered on central axis A1. In an alternative embodiment to optical fiber 510, hollow cores 526 each have a circular cross-section. This alternate embodiment can be considered a special case of the elliptical cross-section hollow core embodiment.

The polygonal cross-sections can be selected so that the filling factor in cases where gaps 350 are determined to be undesirable. Also, polygonal cross-section fibers may in some instances prove easier to stack when forming the hollow core optical fiber array.

Method of Fabrication

A method of forming the hollow core photonic bandgap optical fiber of the present invention is now described. For the sake of illustration, the method is described in connection with forming optical fiber 310 as shown in FIGS. 3A–3C, though the method applies equally to other example embodiments.

Figure 6A:
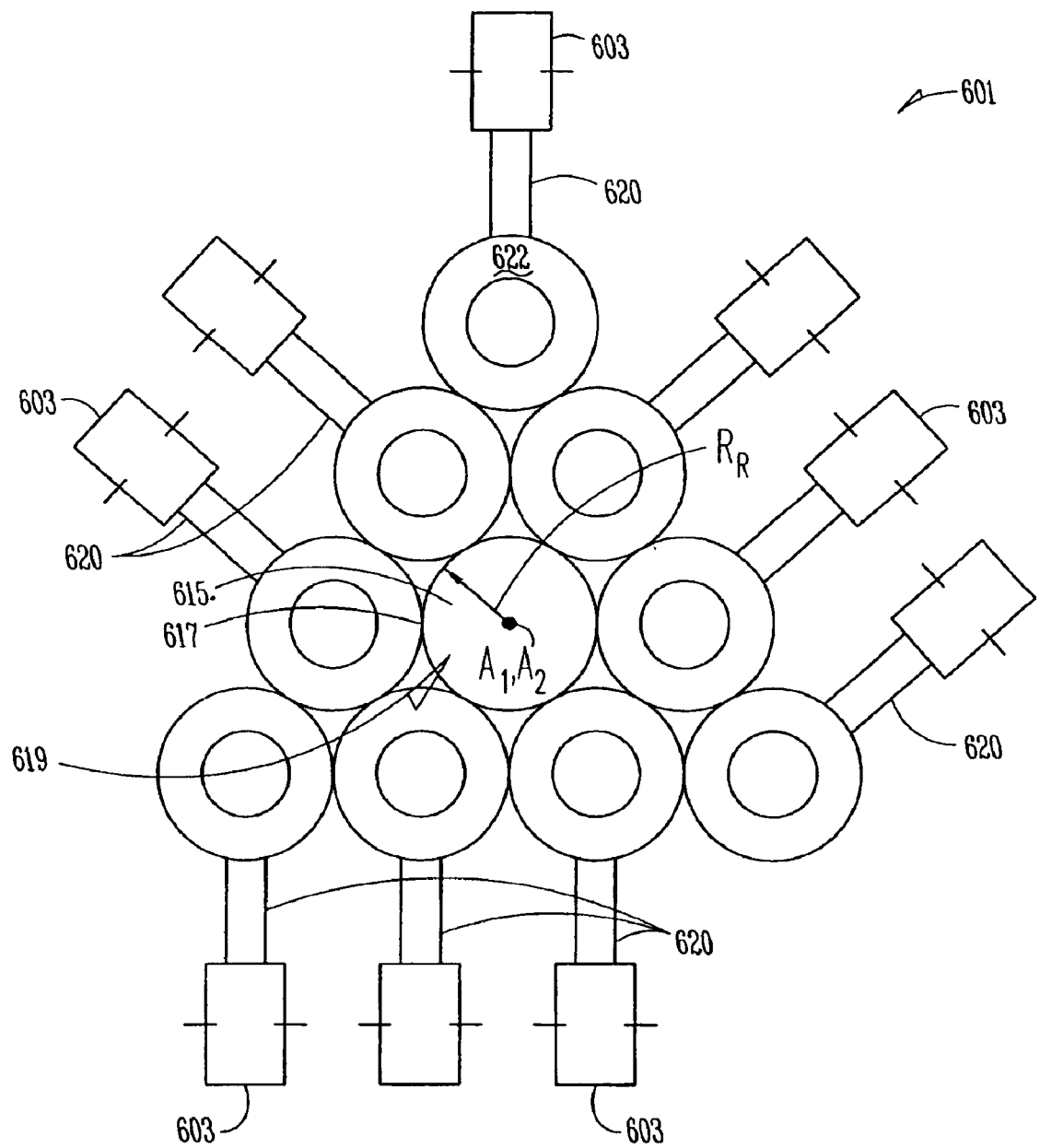
FIG. 6A is a face-on view of an apparatus for forming the hollow core photonic bandgap optical fiber of the present invention, showing first spools of fiber used to form the first layer of fibers on a rod.

FIG. 6A shows front-end view of a fiber-forming apparatus 601 having a number (e.g., nine) of first spools 603 of conventional hollow core optical fiber 620. Each optical fiber 620 has an endface 622. First spools 603 are arranged radially outward from a central axis A2 of a forming rod 615. The forming rod has an outer surface 617, an end 619 and a radius $R_R$. In an example embodiment, radius $R_R=R1$, or alternatively, $R_R \sim R1$.

Figure 6B:
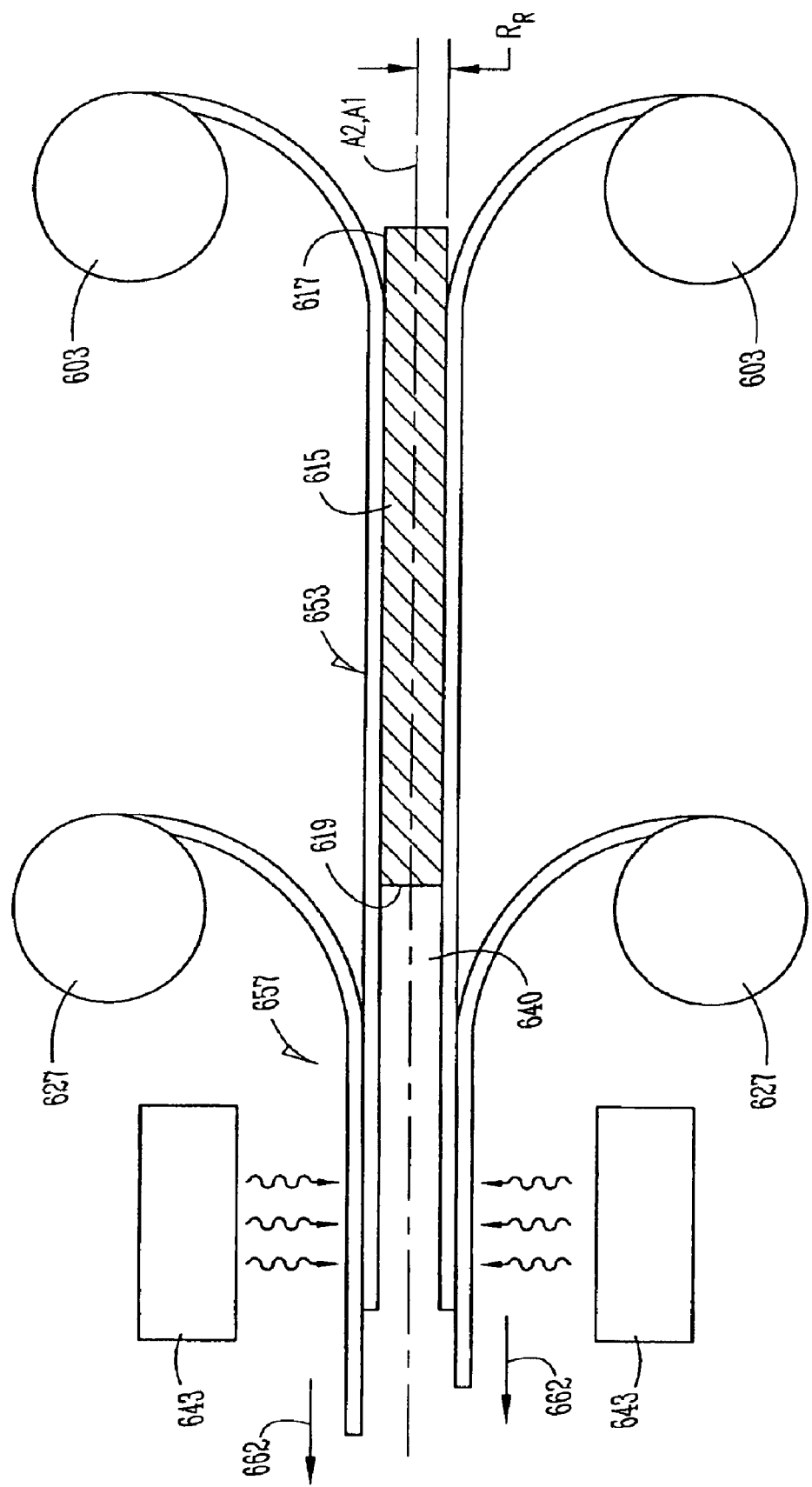
FIG. 6B is a side view of the apparatus of FIG. 6A, showing second spools of fiber used to form the second fiber layer along with two of the heating units used to melt the fiber when it is pulled longitudinally off of the rod.

FIG. 6B is a side view of apparatus 601 of FIG. 6A, showing a number of second spools 627 of optical fiber 620. Second spools 627 are also arranged radially outward from rod central axis A2 but are located closer to rod end 619 so that optical fiber can be arranged over the forming rod or over existing layers of optical fiber placed onto the forming rod. Apparatus 601 includes a number of heat sources 643 are provided adjacent axis A2 in a position to provide heat to the optical fibers surrounding the forming rod.

The technique of forming the hollow core photonic bandgap optical fiber of the present invention is similar to the method of forming a wound electrical cable. Thus, optical fibers 620 from first spools 603 are arranged so that a portion of each optical fiber lies along rod outer surface 617. These fibers form a first optical fiber layer 653. Next, more optical fibers 620 from second spools 627 are arranged so that a portion each fiber lies over the fibers in the first layer in cusps 654 formed by adjoining fibers (FIG. 3B). This forms a second optical fiber layer 657.

The process of layering optical fibers 620 from additional spools (not shown) is repeated until a desired number of layers is formed. Heat is then applied to the layered optical fibers via heat sources 643. When heated to the point where the fibers begin to melt, the layers of optical fibers are pulled off of the forming rod along the direction of the rod axis A2. Optical fibers 620 unwind from the spools during the pulling (arrows 662), thereby forming a continuous optical fiber with a hollow core 640 centered on axis A1 coaxial with forming rod axis A2.

Optical System with Hollow Core Photonic Bandgap Optical Fiber

Figure 7:
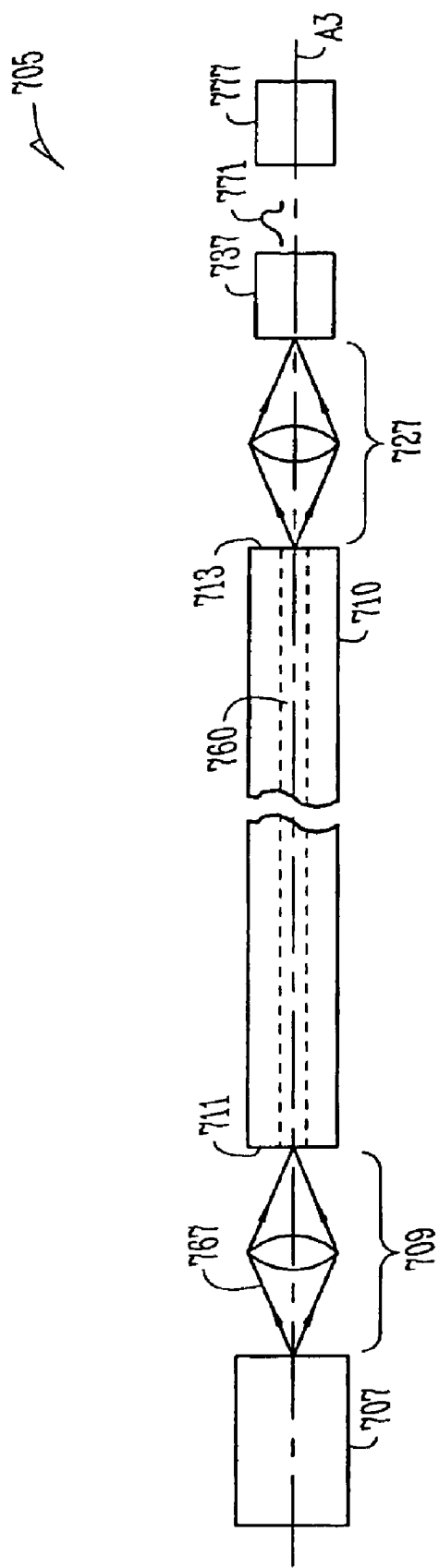
FIG. 7 is a side view of a system employing the hollow core photonic bandgap optical fiber of the present invention.

With reference to FIG. 7, there is shown an optical system 705. The system includes, in order along an axis A3, a radiation source 707, a first optional optical coupler 709, and a hollow core photonic bandgap optical fiber 710 according to the present invention. Optical fiber includes an input end 711, an output end 713, and a hollow core 760. System 705 also includes a second optional optical coupler 727 adjacent output end 713, and a photodetector 737.

Radiation source 707 is capable of outputting radiation 767 of a frequency within the photonic bandgap of optical fiber 710. In one example embodiment, radiation source 707 is a laser, such as a laser diode. In another example embodiment, radiation source 707 is an incoherent radiation source, such as a light-emitting diode or a conventional lamp.

First optical coupler 709 is an optical system designed to facilitate the coupling of radiation from radiation source 707 to hollow core 760 at input end 711 of optical fiber 710. Likewise, second optical coupler 727 is an optical system designed to facilitate the coupling of radiation from hollow core 760 at output end 713 of optical fiber 710 to photodetector 737. First and second optical couplers can include any number or type of optical components, such as lenses, prisms and gratings.

In operation, radiation source 707 outputs a radiation signal 767 having a frequency or range of frequencies within the photonic bandgap of optical fiber 710. Radiation source 707 may also output radiation at frequencies different than the photonic bandgap, but such radiation will not be guided as effectively, if at all, by optical fiber 710. In this sense, optical fiber 710 acts as a radiation filter.

Radiation signal 767 is coupled into hollow core 760 of optical fiber 710 over within a range of input angles by optical coupler 709. The radiation signal is confined to the hollow core by virtue of the photonic bandgap of the surrounding hollow core fiber array and propagates down the optical fiber. At the output end, the radiation signal exits the hollow core and is collected by optical coupler 727, which directs the radiation signal to photodetector 737. The latter receives and detects the radiation signal and outputs a corresponding electrical signal 771, such as a photocurrent, which is further processed by an electronic device 777 downstream of the photodetector. In an example embodiment, electronic device 777 is a transimpedance amplifier that converts a photocurrent signal to a voltage signal.

CONCLUSION

The present invention is a hollow core photonic bandgap optical fiber and method of forming same. The hollow core photonic bandgap optical fiber of the present invention utilizes the advantages of a quasi-two-dimensional bandgap structure to provide a high reflectivity over a select radiation frequency range, while also providing a hollow core that minimizes radiation loss due to absorption. The photonic bandgap is formed by combining conventional hollow core optical fibers in an array along an axis but not on the axis, leaving a hollow core centered on the axis. The diameter of the hollow core is sized to allow for the propagation of select radiation frequencies corresponding to the frequencies of the bandgap associated with the fiber array making up the hollow core photonic bandgap optical fiber.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A waveguide, including:
   a number of hollow core fibers arranged longitudinally around a hollow guide region;
   wherein the number of hollow core fibers are arranged as a two dimensional photonic crystal with a photonic bandgap; and
   wherein the hollow guide region includes geometry that is shaped to channel a signal frequency that is substantially within the photonic bandgap.

2. The waveguide of claim 1, wherein the hollow core fibers include a round core cross section.

3. The waveguide of claim 1, wherein the hollow core fibers include a round outer surface cross section.

4. The waveguide of claim 1, wherein the number of hollow core fibers are arranged as a two dimensional photonic crystal in a triangular lattice.

5. The waveguide of claim 1, wherein the number of hollow core fibers include silica.

6. An optical signal transmission device, including:
   a number of hollow core fibers arranged longitudinally to define a hollow guide region surrounded by the number of hollow core fibers;
   wherein the number of hollow core fibers are arranged as a two dimensional photonic crystal with a photonic bandgap; and
   wherein the hollow guide region includes geometry that is shaped to channel an optical light frequency that is substantially within the photonic bandgap.

7. The optical signal transmission device of claim 6, wherein the hollow core fibers include an elliptical core cross section.

8. The optical signal transmission device of claim 6, wherein the hollow core fibers include a polygonal outer surface cross section.

9. The optical signal transmission device of claim 6, wherein the number of hollow core fibers are arranged as a two dimensional photonic crystal in a triangular lattice.

10. The optical signal transmission device of claim 6, wherein the number of hollow core fibers include silica.

11. A signal transmission system, including:
   a signal generating source;
   an optical coupler;
   a waveguide, including:
      a number of hollow core fibers arranged longitudinally to define a hollow guide region enclosed by the number of hollow core fibers;

wherein the number of hollow core fibers are arranged as a two dimensional photonic crystal with a photonic bandgap;

wherein the hollow guide region includes geometry that is shaped to channel a signal frequency that is substantially within the photonic bandgap; and a photodetector.

12. The signal transmission system of claim 11, wherein the signal generator includes a laser source.

13. The signal transmission system of claim 11, wherein the signal generator includes a light emitting diode.

14. The signal transmission system of claim 11, wherein the hollow guide region geometry is defined by a space of one missing fiber within a lattice pattern of the number of hollow core fibers.

15. A waveguide, including:

a number of hollow core fibers arranged longitudinally to define a hollow guide region;

wherein the number of hollow core fibers are arranged as a two dimensional wave channeling means; and wherein the hollow guide region includes geometry that is shaped to channel a signal frequency that is substantially contained within the channeling means.

16. The waveguide of claim 15 wherein the hollow guide region is located at a central axis of the waveguide.

17. The waveguide of claim 15 wherein the hollow guide region geometry is defined by a space of one missing fiber within a lattice pattern of the number of hollow core fibers.

18. The waveguide of claim 15 wherein the number of hollow core fibers are arranged with a filling factor of 55 percent.

19. A waveguide, including:

a number of hollow tube shaped fibers arranged longitudinally around a hollow guide region;

wherein the number of hollow tube shaped fibers are arranged as a two dimensional photonic crystal with a photonic bandgap; and wherein the hollow guide region includes geometry that is shaped to channel a signal frequency that is substantially within the photonic bandgap.

20. The waveguide of claim 19, wherein the number of hollow tube shaped fibers are arranged with a filling factor of greater than about 50 percent.

21. The waveguide of claim 19, wherein the number of hollow tube shaped fibers are arranged as a two dimensional photonic crystal in a triangular lattice.

22. The waveguide of claim 19, wherein the hollow guide region has an effective diameter between about 0.5 and about 5 microns.

* * * * *

UNITED STATES PATENT AND TRADEMARK OFFICE
CERTIFICATE OF CORRECTION

PATENT NO.    : 6,950,585 B2
DATED         : September 27, 2005
INVENTOR(S)   : Forbes et al.

It is certified that error appears in the above-identified patent and that said Letters Patent is hereby corrected as shown below:

Title page,
Item [56], References Cited, OTHER PUBLICATIONS,
"Baba" (1st occurrence) reference, delete "Paper" and insert -- Papers --.
"Jones-Bey, H.," reference, delete "solutions" and insert -- solitons --.
"Monro, T. M., et al." reference, delete "TechnoloTgy" and insert -- Technology --.
"Scherer, A., et al." reference, after "Research Conference" delete "," and insert -- . --.

Column 2,
Line 9, delete "an" and insert -- a --.
Line 25, delete "lossy" and insert -- glossy --.

Column 5,
Line 67, after "$(R1)^2$]" insert -- ~ --.
Line 67, delete "$(R^2)/(R1)^{2]}$" and insert -- $(R^2)/(R1)^2$] --.

Signed and Sealed this

Twenty-first Day of February, 2006

JON W. DUDAS
*Director of the United States Patent and Trademark Office*